US005107282A

United States Patent [19]

Morohoshi et al.

[11] Patent Number: 5,107,282

[45] Date of Patent: Apr. 21, 1992

[54] TRANSFER-TYPE ELECTROTHERMOGRAPHIC RECORDING METHOD AND RECORDING APPARATUS FOR USE WITH THE SAME

[75] Inventors: Kunichika Morohoshi, Mumazu; Toshiyuki Kawanishi; Masato Igarashi, both of Numazu, all of Japan

[73] Assignee: Ricoh Company, Ltd., Tokyo, Japan

[21] Appl. No.: 646,231

[22] Filed: Jan. 28, 1991

[30] Foreign Application Priority Data

| | | | |
|---|---|---|---|
| Jan. 29, 1990 | [JP] | Japan | 2-16173 |
| Feb. 5, 1990 | [JP] | Japan | 2-24459 |
| Mar. 14, 1990 | [JP] | Japan | 2-61129 |

[51] Int. Cl.[5] .......... G01D 15/06

[52] U.S. Cl. .......... 346/153.1; 346/76 PH

[58] Field of Search .......... 346/76 PH, 153.1

[56] References Cited

U.S. PATENT DOCUMENTS 4,636,815 1/1987 Yuasa .......... 346/153.1

*Primary Examiner*—Benjamin R. Fuller
*Assistant Examiner*—R. W. Gibson
*Attorney, Agent, or Firm*—Oblon, Spivak, McClelland, Maier & Neustadt

[57] ABSTRACT

A transfer-type electrothermographic recording method is disclosed, which comprises the steps of uniformly charging an electrothermographic recording layer to a predetermined polarity, which exhibits chargeability A at room temperature and chargeability B above room temperature, where the chargeabilities A and B are in the relationship of $A > B \geqq 0$; forming a latent electrostatic image on the charged surface of the electrothermographic recording layer by applying thermal signals which correspond to an original image to the side opposite the charged surface of the electrothermographic recording layer; and developing the latent electrostatic image with a toner of which polarity is the same as or opposite to the polarity of the latent electrostatic image to form a toner image. This transfer-type electrothermographic recording method may further comprise a step of transferring the toner image to a receiving medium; and a step of fixing the toner image transferred onto the receiving medium. An apparatus for the above transfer-type electrothermographic recording method is also disclosed.

14 Claims, 9 Drawing Sheets

TRANSFER-TYPE ELECTROTHERMOGRAPHIC RECORDING METHOD AND RECORDING APPARATUS FOR USE WITH THE SAME

BACKGROUND OF THE INVENTION

1. Field of the Invention

This invention relates to a transfer-type electrothermographic recording method and a recording apparatus for use with the same.

2. Discussion of Background

The following electrothermographic recording methods have been conventionally proposed:

(a) A method as disclosed in Japanese Patent Publication 35-14722, using an electrothermographic recording medium comprising an electroconductive support and a resinous layer formed thereon, for which electric resistance decreases upon application of heat thereto. In this method, the resinous layer is electrostatically charged, and heat rays are applied to the electrostatically charged resinous layer to form a latent electrostatic image on the resinous layer, corresponding to an original image to be reproduced. The resinous layer comprises, for instance, polyvinyl chloride, polyethylene, polyester, polystyrene or a styrene - maleic acid copolymer.

(b) A recording method as disclosed in Japanese Patent Publication 38-14347, in which an electrothermographic material made of, for instance, polyester, chlorinated polyvinyl chloride or vinyl chloride, which is sufficiently transparent to heat rays, is superimposed on an original image to be reproduced, electrostatically charged, and exposed to heat rays in such a fashion as to correspond to the original image to form a corresponding latent electrostatic image. The latent electrostatic image formed on the electrothermographic material is then reversely developed with a dry toner to form a visible toner image, and the toner image is fixed thereto.

In the above methods, an infrared ray is applied to the recording medium which is placed in close contact with an original image. Therefore, a large amount of energy is required for recording, and images with high resolution cannot be obtained. In addition, since these recording media are made of electrically chargeable materials, they are costly.

To eliminate the conventional shortcomings, a transfer-type electrothermographic recording method has been proposed. This method employs an electrothermographic recording medium which is constructed in such a manner that a resinous layer serving as an electrothermographic recording layer of which electrical resistivity is large at room temperature and is decreased when heated, is formed on an electroconductive layer. In this recording method, the resinous layer is uniformly charged, and a latent electrostatic image is formed on the charged resinous layer by applying thermal signals which correspond to an original image to be reproduced to the charged surface of the recording layer. The latent electrostatic image thus formed is developed with a toner of which polarity is the same as that of the latent electrostatic image to form a toner image. The thus formed toner image is transferred to a receiving medium, for example, a sheet of plain paper, and then fixed thereon.

The basic process of the above-mentioned conventional transfer-type electrothermographic recording method will now be described with reference to FIG. 1(*a*) to FIG. 1 (*e*).

In these figures, an electrothermographic recording medium 3 comprises an electrothermographic recording layer 1 and an electroconductive layer 2, on which the electrothermographic recording layer 1 is formed.

FIG. 1(*a*) is a schematic illustration showing a charging step, in which the electrothermographic recording layer 1 (hereinafter referred to as the recording layer 1) is uniformly charged. In this figure, the recording layer 1 is charged to a negative polarity by a negative corona charger 4. The means for charging the recording layer 1 is not limited to a corona charger, but, for instance, a roller charger and a brush charger can also be employed.

FIG. 1(*b*) is a schematic illustration showing a thermal-writing step, in which the thermal signals corresponding to an original image to be reproduced are applied to the recording layer 1 by using a thermal head 5. Thus, a latent electrostatic image is formed on the recording layer 1.

FIG. 1(*c*) is a schematic illustration showing a development step, in which the latent electrostatic image formed in the thermal writing step is developed by reversal development, using a toner 6 of which polarity is the same as that of the latent electrostatic image, so that a toner image is formed in the portion where the thermal signals were applied. In the development step shown in this figure, a negatively charged toner, which is hereinafter referred to as a negative toner, is employed.

FIG. 1 (*d*) is a schematic illustration showing an image transfer and fixing step, in which the toner image formed on the recording layer 1 is transferred to a receiving medium 7 such as a transfer sheet with application of positive charge thereto by a positive corona charger 8 for image transfer. The toner image transferred to the receiving medium 7 may be heated by application of heated air or by using a heat-application plate or roller for fixing the toner image onto the receiving medium 7. In this step, a transfer roller which applies positive charge (not shown) may be used instead of the positive corona charger 8.

FIG. 1(*e*) is a schematic illustration showing a cleaning step, in which the remaining toner and residual electric charge on the surface of the recording layer 1 are cleaned by a cleaning roller 9, after the image transfer and fixing step. The cleaning roller 9 serves as initialization means when the above electrothermographic recording medium 3 is used repeatedly.

By repeating the above recording process, digital information can be recorded even on a sheet of plain paper.

In the above-described conventional electrothermographic recording method, however, in the course of the recording process, corona charges, thermal signals for the formation of latent electrostatic images, and physical pressure for toner image transfer and fixing are repeatedly applied only to the front surface of the recording layer 1 where the toner image is developed. Therefore the surface of the electrothermographic recording layer physically deteriorates while in use. The result is that the reliability of this recording method is not high.

SUMMARY OF THE INVENTION

Accordingly, a first object of the present invention is to provide a transfer-type electrothermographic recording method from which the conventional drawbacks are eliminated and by which information can be recorded on plain paper without causing deterioration of a recording medium used therewith.

A second object of the present invention is to provide a recording apparatus for use with the above transfer-type electrothermographic recording method.

The first object of the present invention can be attained by a transfer-type electrothermographic recording method comprising the steps of uniformly charging an electrothermographic recording layer to a predetermined polarity, which exhibits chargeability A at room temperature and chargeability B above room temperature, where the chargeabilities A and B are in the relationship of $A>B\geqq 0$; forming a latent electrostatic image on the charged surface of the electrothermographic recording layer by applying thermal signals which correspond to an original image to the side opposite the charged surface of the electrothermographic recording layer; and developing the latent electrostatic image with a toner of which polarity is the same as or opposite to the polarity of the latent electrostatic image to form a toner image. This transfer-type electrothermographic recording method may further comprise a step of transferring the toner image to a receiving medium; and a step of fixing the toner image transferred onto the receiving medium.

The above-mentioned second object of the present invention can be attained by a recording apparatus comprising charging means for uniformly charging an electrothermographic recording layer to a predetermined polarity, which exhibits chargeability A at room temperature and chargeability B above room temperature, where the chargeabilities A and B are in the relationship of $A>B\geqq 0$; latent electrostatic image formation means for forming a latent electrostatic image on the charged surface of the electrothermographic recording layer by applying thermal signals which correspond to an original image to the side opposite the charged surface of the electrothermographic recording layer; and development means for developing the latent electrostatic image with a toner of which polarity is the same as or opposite to the polarity of the latent electrostatic image to form a toner image. This recording apparatus image may further comprise transfer means for transferring the toner image to a receiving medium; and image fixing means for fixing the toner image transferred onto the receiving medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
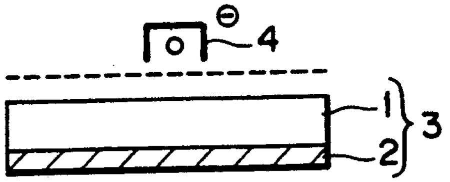
FIG. 1(a) PRIOR ART
FIGS. 1(*a*) to 1(*e*) are schematic illustrations showing the sequential steps of a conventional transfer-type electrothermographic recording method.
Figure 1B:
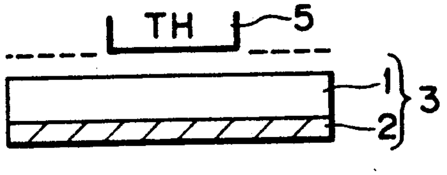
FIG. 1(b) PRIOR ART
Figure 1C:
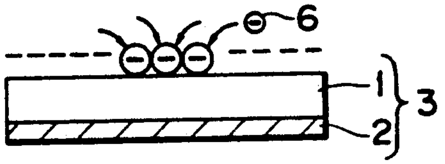
FIG. 1(c) PRIOR ART
Figure 1D:
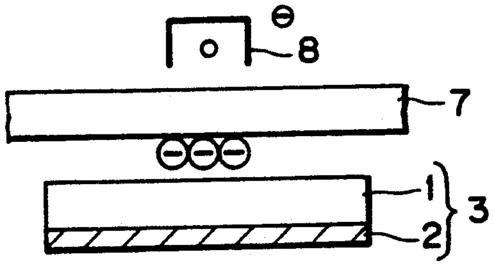
FIG. 1(d) PRIOR ART
Figure 1E:
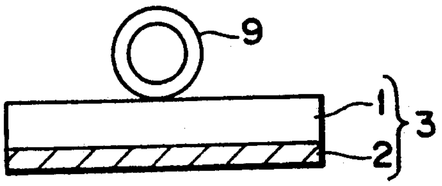
FIG. 1(e) PRIOR ART

Referring now to the drawings, wherein like reference numerals designate identical or corresponding parts throughout the several views.

The electrothermographic recording layer of the recording medium for use with the transfer-type electrothermographic recording method according to the present invention comprises a thermoplastic resin having a softening point of, preferably 30° to 200° C., more preferably 60° to 150° C., and a volume resistivity of $1\times 10^{12}\Omega$.cm or more at 25° C. and $1\times 10^{14}\Omega$.cm or less in the range of 110° to 130° C., which is smaller than the volume resistivity at 25° C.

In particular, it is preferable that the volume resistivity of the above dielectric material at a temperature in the range of 110° to 130° C. be 1/50 times or less, more preferably 1/1000 times or less, the volume resistivity thereof at 25° C. When the volume resistivity of the dielectric material of the electrothermographic recording layer is in the above-mentioned range, not only the toner deposition on the background of the recording medium can be avoided, but also the decrease in the image density of the obtained images can be prevented. In addition, a satisfactory signal-to-noise ratio can be obtained when the volume resistivity of the dielectric material at a temperature in the range of 110° to 130° C. is sufficiently smaller than the volume resistivity thereof at 25° C.

Specific examples of the thermoplastic resin which can be used for the electrothermographic recording layer include polyvinyl chloride, cellulose acetate, polyacetal, a vinyl chloride - vinyl acetate copolymer, an ethylene - vinyl acetate copolymer, an acrylic polymer, a styrene polymer, polyester, polyamide, polyethylene, polypropylene, a polypropylene polymer, a fluorinated-acryl - acryl copolymer, and a styrene - acryl copolymer. Of these, a fluorinated-acryl - acryl copolymer, polypropylene and a polypropylene-based polymer are preferred. In particular, polypropylene, and a polypropylene copolymer and mixtures thereof are preferable.

Examples of the above-mentioned polypropylene copolymer include a polypropylene - ethylene copolymer, a polypropylene - butene copolymer, a polypropylene - ethylene-butene terpolymer, a polypropylene - vinylacetate copolymer, a polypropylene - ethylacrylate copolymer, and a polypropylene - ionomer copolymer.

It is preferable that the thickness of the electrothermographic recording layer be in the range of 5 to 100 μm, more preferably 10 to 30 μm.

Figure 2A:
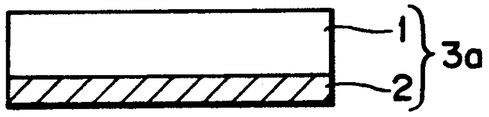
FIGS. 2(*a*) and 2(*b*) are schematic cross-sectional views of transfer-type electrothermographic recording media for use with the transfer-type electrothermographic recording method according to the present invention.
Figure 2B:
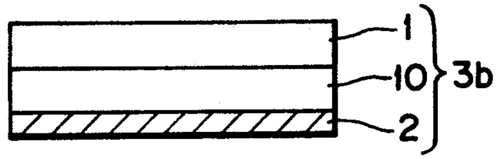

FIGS. 2*a* and 2*b* are the schematical cross-sectional views of typical examples of a transfer-type electrothermographic recording medium for use with the electrothermographic recording method according to the present invention.

The recording medium shown in FIG. 2(*a*) is composed of an electrothermographic recording layer 1 and an electroconductive layer 2 on which the recording layer 1 is formed. An aluminum-deposition layer with a thickness of 100 to 2000 Å or a layer treated with an electroconductivity-imparting agent is used as the electroconductive layer 2. When a metallic drum or belt is used as the electroconductive layer 2, the metallic drum or belt can be served as the base layer, without particularly providing a base layer.

The recording medium shown in FIG. 2(*b*) is composed of an electrothermographic recording layer 1 formed on a base layer 10, and an electroconductive layer 2, which is formed on the back side of the base layer 10 opposite the recording layer 1 with respect to the base layer 10. The electrothermographic recording layer 1 comprises a thermoplastic resin having a softening point of, preferably 30° to 200° C., more preferably 60° to 150° C., as mentioned previously.

The base layer 10 which supports the electrothermographic recording layer 1 comprises a material having film-forming properties, such as polyester, vinyl chloride or polyethylene. If the base layer 10 is made of a dielectric film, the base layer 10 itself can also be used as the electrothermographic recording layer 1.

It is better to provide the electroconductive layer 2 on the back side of the base layer 10, opposite the electrothermographic recording layer 1, in order to uniformly charge the electrothermographic recording layer 1. However, in the case where the recording layer 1 is charged on a metallic roller or plate, the electroconductive layer 2 is not necessarily required.

As described previously, in the conventional electrothermographic recording method, thermal signals are repeatedly applied by using a thermal head 5 to the electrothermographic recording layer 1 where a latent electrostatic image is developed with the toner 6, as shown in FIG. 1(*b*). As a result, the surface of the electrothermographic recording layer gradually deteriorates while in use, so that the reliability of the recording method inevitably decreases.

Figure 3:
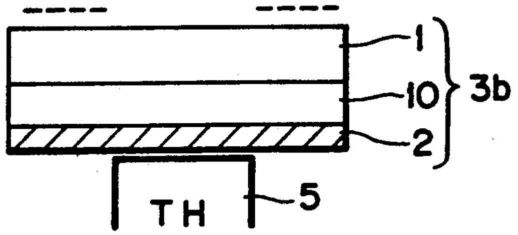
FIG. 3 is a schematic illustration of a thermal-writing step according to the transfer-type electrothermographic recording method of the present invention.

According to the present invention, in order to solve this problem, thermal signals which correspond to an original image to be reproduced are applied, using a thermal head 5, to the electroconductive layer 2, opposite the charged surface of the electrothermographic recording layer 1 for formation of a latent electrostatic image, as shown in FIG. 3. Because of the aforementioned thermal-writing step in the recording method of the present invention, the surface of the electrothermographic recording layer, on which the latent electrostatic image is formed and developed into a visible toner image with a toner, is neither directly contacted with the thermal head 5 nor directly heated by the thermal head 5. Thus, the deterioration of the recording layer can be avoided.

In the above method, it is preferable that the electroconductive layer 2 of the recording medium **3*a* have a thickness of 1 μm or less when the electroconductive layer 2 is made of, for example, a material having good thermal conductivity, such as an aluminum, in order to prevent the diffusion of the heat applied by the thermal head 4 to the recording medium 3*a* through the electroconductive layer 2**.

Other features of this invention will become apparent in the course of the following description of exemplary embodiments, which are given for illustration of the invention and are not intended to be limiting thereof.

EXAMPLE 1

Figure 4:
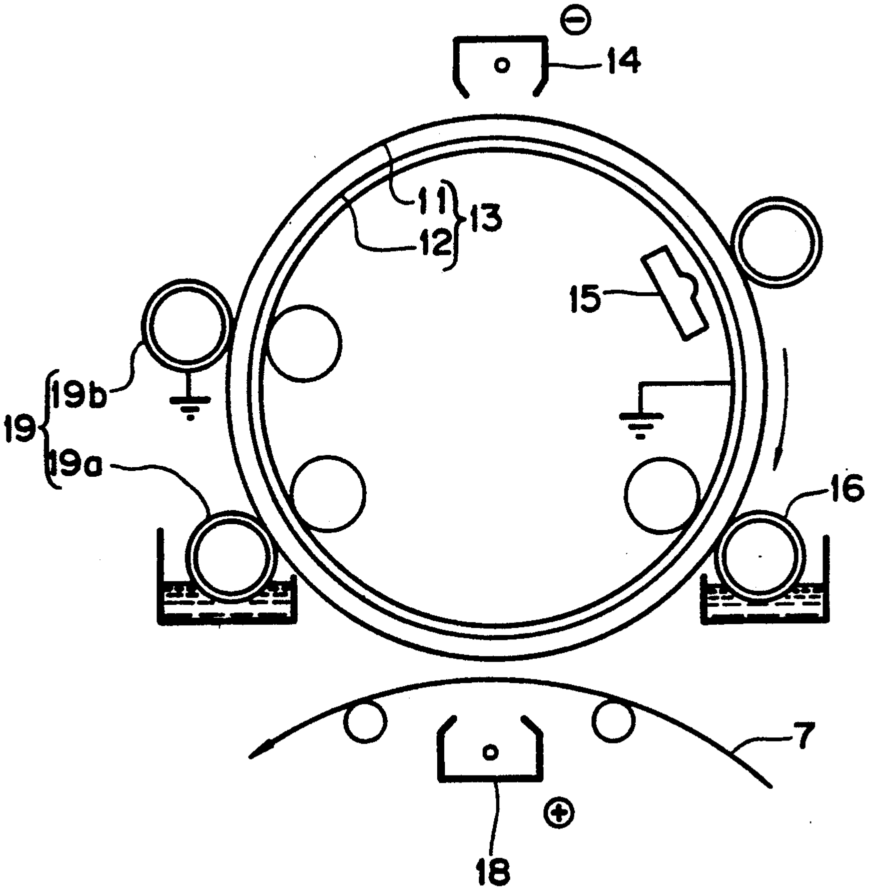
FIG. 4 is a schematic illustration of a first embodiment of the recording apparatus for the transfer-type electrothermographic recording method according to the present invention.

An electrothermographic recording medium 13 with a structure as shown in FIG. 2(*a*), comprising a polypropylene sheet with a thickness of 15 μm serving as an electrothermographic recording layer 11 and an aluminum-deposition layer with a thickness of 2000 Å, serving as an electroconductive layer 12, was prepared in the form of a drum shown in FIG. 4. Using the above recording medium 13, a transfer-type electrothermographic recording apparatus No. 1 according to the present invention was constructed as shown in FIG. 4.

In this recording apparatus, the electrothermographic recording layer 11 of the recording medium 13 was charged by a negative corotron charger 14 to make the surface potential thereof −600 V. Thermal image recording signals with a thermal energy of 0.5 mJ/dot were applied to the electroconductive layer 12 opposite the electrothermographic recording layer 11 by using a thermal head 15 with a dot density of 8 dots/mm to form a latent electrostatic image on the electrothermographic recording layer 11.

The latent electrostatic image thus formed was developed to a visible toner image with a commercially available liquid toner for a wet-type copier, made by Ricoh Company, Ltd. in a development unit 16. The resulting toner image was transferred to a transfer sheet 7 under application of a positive charge to the transfer sheet 7 by a positive corona charger 18 in an image-transfer zone. The toner remaining on the electrothermographic recording layer 11 of the recording medium 13 was cleaned by a cleaning unit 19 composed of an isopropylalcohol-impregnated sponge roller **19*a* and an electroconductive rubber roller 19*b*, which serves as an initialization means for the recording medium 13**.

A recording test was carried out by continuously repeating such a recording process 50 times. The result was that there was no deterioration in the quality of the obtained images throughout the test.

In the electrothermographic recording method of the present invention, thermal signals are applied to the side opposite the charged surface of the electrothermographic recording layer 1, that is, to the electroconductive layer 2, as shown in FIG. 3. Therefore, the formation and development of a latent electrostatic image can be performed simultaneously.

In this case, when the electroconductive layer 2 of the recording medium 3 is, for example, an aluminum sheet having good heat conductivity, it is better to decrease the thickness of the electroconductive layer 2 in order to avoid the thermal diffusion through the electroconductive layer 2. It is preferable that the thickness of the electroconductive layer be 1 μm or less as mentioned previously.

EXAMPLE 2

Figure 5:
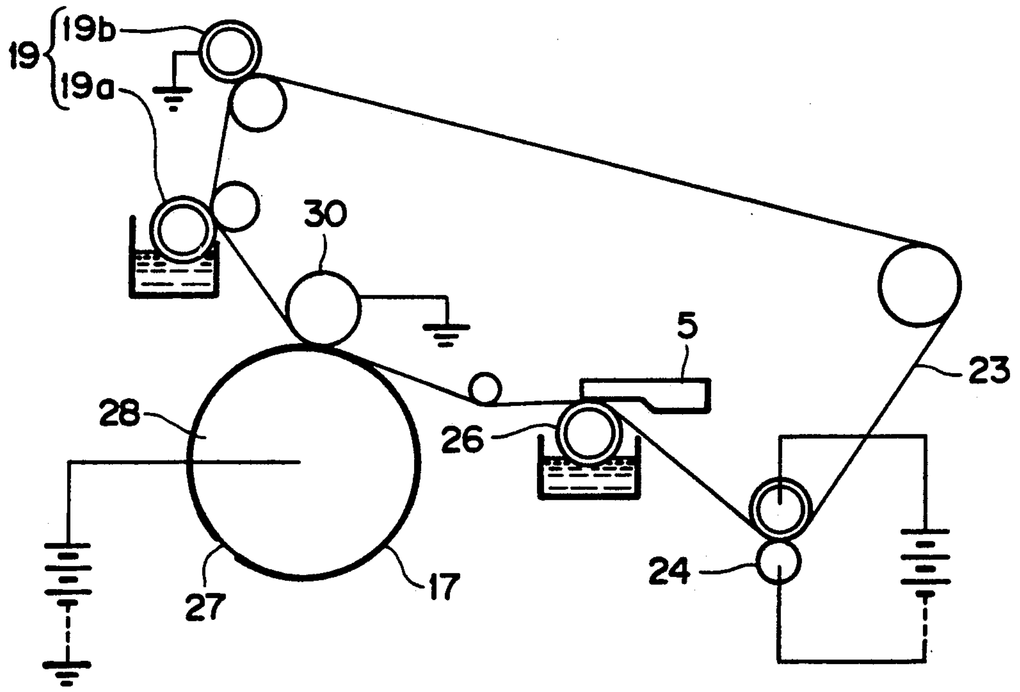
FIG. 5 is a schematical illustration of a second embodiment of the recording apparatus for the transfer-type electrothermographic recording method according to the present invention.
Figure 6A:
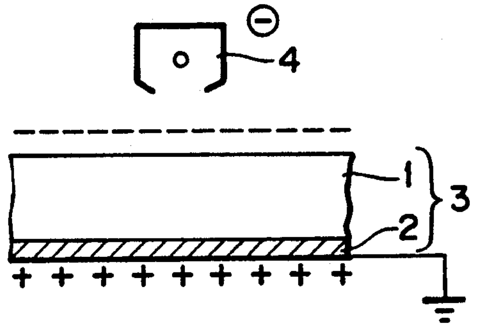
FIGS. 6(*a*) to 6(*d*) are schematical illustrations of another example of a process of the transfer-type electrothermographic recording method according to the present invention.
Figure 6B:
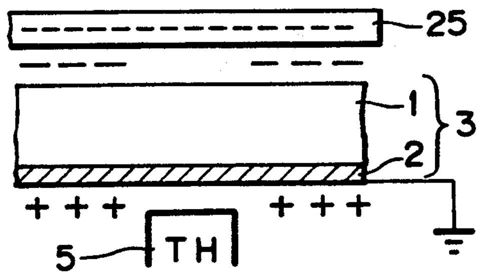
Figure 6C:
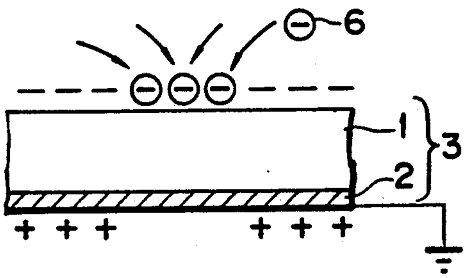
Figure 6D:
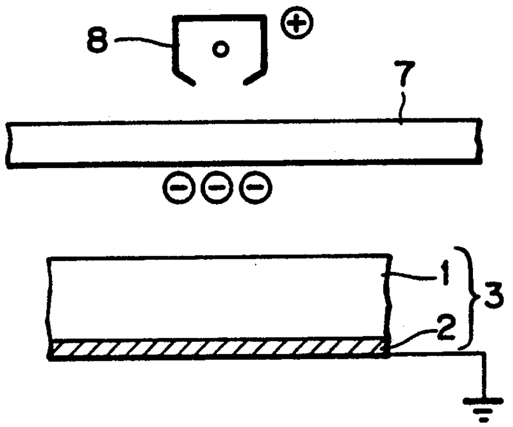

An electrothermographic recording medium 23 with a structure as shown in FIG. 2*b*, comprising a polypropylene sheet with a thickness of 15 μm serving as an electrothermographic recording layer and an aluminum-deposition layer with a thickness of 2000 Å serving as an electroconductive layer was prepared in the form of an endless belt. Using the above recording medium 23, an electrothermographic recording apparatus No. 2 according to the present invention was constructed as shown in FIG. 5.

In this recording apparatus, the electrothermographic recording medium 23 was incorporated in such a configuration that the electroconductive layer thereof was directed to a thermal head 5 from which thermal signals were applied to the electroconductive layer, so that the electrothermographic recording layer was not directly heated by the thermal head.

A voltage of about −600 V was applied to the electrothermographic recording layer of the electrothermographic recording medium 23 by causing the recording medium 23 to pass over a negative charging roller 24, so that the surface of the electrothermographic recording layer was uniformly charged to a negative polarity.

A thermal image recording signal with a thermal energy of 0.5 mJ/dot was applied to the side of the electroconductive layer of the recording medium 23 by using the thermal head 5 with a dot density of 8 dots/mm to form a latent electrostatic image on the electrothermographic recording layer. Simultaneously with the formation of the latent electrostatic image, the latent electrostatic image was developed to a visible toner image, with the recording medium 23 held between the thermal head 5 and a development roller 26 which was constructed in such a manner that a sponge overlayer with a thickness of 3 mm made of natural rubber was provided on a platen roller made of a silicone rubber having a rubber hardness of 45° and was impregnated with a commercially available liquid toner for a wet-type copier, made by Ricoh Company, Ltd.

The resulting toner image was transferred to a transfer sheet 17 under application of a positive charge to the transfer sheet 17 by a positive charge application roller 28, with the toner-image-bearing transfer sheet 17 being held between the positive charge application roller 28 and an image transfer roller 30. In the course of the image transfer step, the transfer sheet 17 was wound around the positive charge application roller 28 by a clamp 27.

The toner remaining on the electrothermographic recording layer of the recording medium 23 was cleaned by a cleaning unit 19 composed of an isopropylalcohol-impregnated sponge roller 19*a* and an electroconductive rubber roller 19*b*, which serves as an initialization means for the recording medium 23.

A recording test was carried out by continuously repeating such a recording process 50 times. The result was that there was no deterioration in the quality of the obtained images throughout the test.

In the present invention, to accomplish more application of thermal image recording signals to the electrothermographic recording medium, the following step may be added to the electrothermographic recording method of the present invention. Namely, a bias voltage with the same polarity as that of the latent electrostatic image formed on the recording layer is applied to the recording layer opposite the thermal head simultaneously with the application of the thermal signals by the above thermal head.

The principle of the above-mentioned recording method will be described in detail with reference to FIGS. 6*a* to 6*d*.

FIG. 6(*a*) is a schematic illustration showing a charging step, in which the electrothermographic recording layer 1 of the electrothermographic recording medium 3 is uniformly charged by a corona charger 4. In this figure, the electrothermographic recording layer 1 is charged to a negative polarity by a negative corona charger 4. The means for charging the recording medium is not limited to the corona charger, but, for instance, a roller charger and a brush charger can also be employed.

FIG. 6(*b*) is a schematic illustration showing a thermal-writing step, in which the thermal signals corresponding to an original image to be reproduced are applied to the electroconductive layer 2 by a thermal head 5. During the application of the thermal signals, a bias voltage with the same polarity as that of the latent electrostatic image formed on the electrothermographic recording layer 1 is applied to the electrothermographic recording layer 1 of the recording medium opposite to the thermal head 5 by bias voltage application means 25 which is situated opposite to the thermal head 5 with respect to the recording medium 3, such as a platen roller or other bias voltage application member, which is in close or pressure contact with the electrothermographic recording layer 1. For instance, as shown in this figure, a bias voltage with a negative polarity is applied to the electrothermographic recording layer 1, which is in pressure contact with a side of the recording medium, opposite to the thermal head 5. Thus, the reduction in the signal-to-noise ratio (S/N ratio) of the latent electrostatic image formed can be made zero or minimized.

In this recording method, the application of thermal image formation signals can be applied to the electrothermographic recording medium, for example, by a serial or line thermal head with a dot density of 8 dots/mm to 16 dots/mm.

FIG. 6(*c*) is a schematic illustration showing a development step, in which the latent electrostatic image is developed with a toner 6 of which polarity is the same as that of the latent electrostatic image to a toner image. In the development step shown in this figure, a negative toner is employed. However, a positive toner can be, of course, employed to form a negative toner image.

FIG. 6(*d*) is a schematic illustration showing an image transfer and fixing step, in which the toner image formed on the electrothermographic recording layer 1 is transferred to a receiving medium 7 such as a transfer sheet, with application of positive charge to the receiving medium 7 by a positive corona charger 8. The toner image transferred to the receiving medium 7 may be heated by heated air or by using a heat-application plate or roller for fixing the toner image onto the receiving medium 7. In this step, a transfer roller which applies positive charge (not shown) may be used instead of the positive corona charger 8.

The remaining toner and residual electric charge on the surface of the electrothermographic recording layer 1 are then cleaned. Thus, the recording medium can be repeatedly used.

The intensity of the bias voltage applied to the electrothermographic recording medium in the above-mentioned thermal-writing step in FIG. 6(*b*) may preferably be determined according to the pattern of images which are thermally written in the recording medium. For instance, a bias voltage with substantially the same potential as that of the latent electrostatic image may be applied to the recording medium in the case of a line image. In the case of a solid image, the potential of the bias voltage may be 1/5 to 1/10 times that of the latent electrostatic image. The intensity of the above bias voltage can be controlled depending on the image pattern by feeding back the thermal signals for each line to a bias-voltage-application member.

EXAMPLE 3

An electrothermographic recording medium 33 with a structure as shown in FIG. 2(*a*), comprising a polypropylene film with a thickness of 25 μm serving as an electrothermographic recording layer and an aluminum-deposition layer serving as an electroconductive layer, was fabricated in the form of an endless belt.

Figure 7:
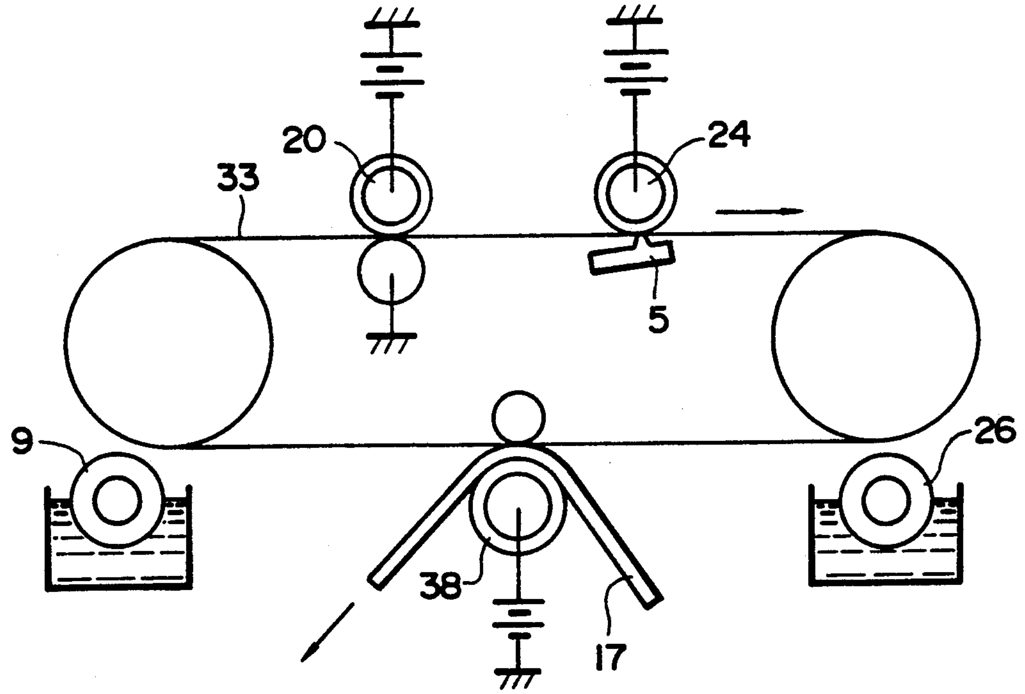
FIG. 7 is a schematical illustration of a third embodiment of the recording apparatus for the transfer-type electrothermographic recording method according to the present invention.

An electrothermographic recording apparatus No. 3 according to the present invention was constructed as shown in FIG. 7, in which the above fabricated electrothermographic recording medium 33 was incorporated in such a fashion that the electrothermographic recording layer thereof was positioned outside.

The electrothermographic recording layer of the recording medium 33 was uniformly charged so as to have a surface potential of −600 V by a negative charging roller 24, which was positioned opposite to a thermal head 5 with respect to the recording medium 33.

A thermal image recording signal was applied to the electroconductive layer of the recording medium 33 by the thermal head 5 which was positioned right under the negative charging roller 24 by the thermal head 5 through the recording medium 33, so that a latent electrostatic image was formed on the electrothermographic recording layer. Simultaneously with the application of the thermal image recording signal, a bias voltage of −600 V was applied to the electrothermographic recording layer of the recording medium 33, using a bias voltage application roller 20.

The latent electrostatic image thus formed was developed to a visible toner image by using a development roller 26 impregnated with a commercially available liquid developer for a plain paper copier, made by Ricoh Company, Ltd.

The resulting toner image was transferred to a transfer sheet 17 under application of a positive charge to the transfer sheet 17 by a positively-charged transfer roller 38.

As a result, character images with an image density as high as 1.4 were obtained on the transfer sheet 17.

The toner and electric charge remaining on the recording medium was cleaned by a cleaning roller 9.

In the above recording process the thermal image recording signal was applied to the electroconductive layer of the recording medium 33, so that deformation of the electrothermographic recording layer was avoided and therefore the residual toner and electric charge were completely removed from the surface of the recording layer at the cleaning step. According to the above recording method, high quality images were obtained even after the above process was repeated.

EXAMPLE 4

Figure 8:
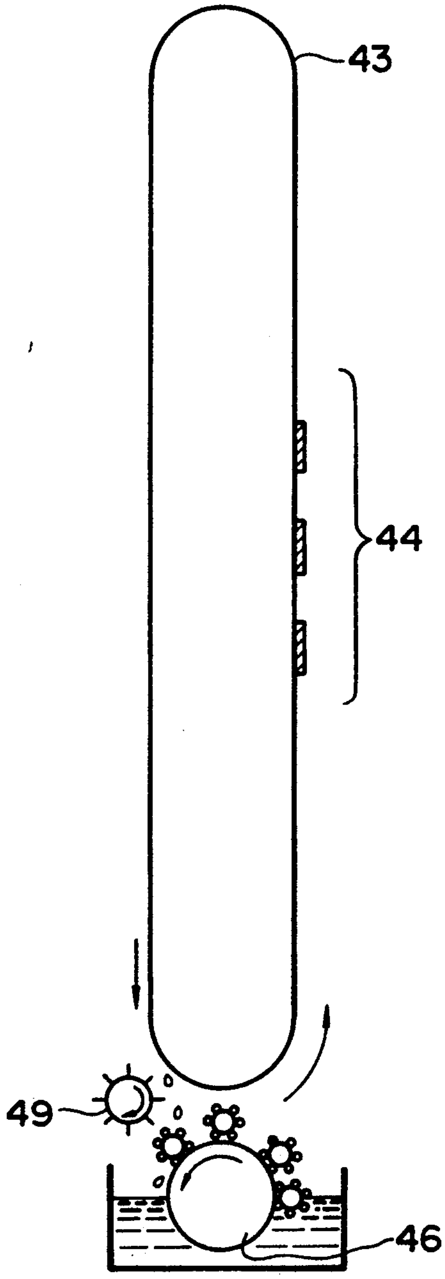
FIG. 8 is a schematic illustration of a display device fabricated by utilizing the transfer-type electrothermographic recording method according to the present invention.

An electrothermographic recording medium 43 with a structure as shown in FIG. 2(*a*), comprising a polyethylene terephthalate film containing a white pigment with a thickness of 50 μm serving as an electrothermographic recording layer and an aluminum-deposition layer serving as an electroconductive layer, was fabricated in the form of an endless-belt-shaped display apparatus as illustrated in FIG. 8.

The electrothermographic recording layer of the recording medium 43 was uniformly charged so as to have a surface potential of +700 V by a positive charging roller (not shown) which was positioned opposite to a thermal head 5 with respect to the recording medium 43.

A thermal image recording signal was applied to the electroconductive layer of the recording medium 43 by a thermal head with a dot density of 8 dots/mm (not shown) which was positioned right under the positive charging roller through the recording medium 43, so that a latent electrostatic image was formed on the electrothermographic recording layer.

The latent electrostatic image thus formed was developed to a visible toner image 44 by a development roller 46 with a commercially available positive cyan powder toner for use with a color copier (Trademark "ARTAGE-5330, made by Ricoh Company, Ltd.). The thus constructed display apparatus can be used repeatedly by erasing the toner image with a cleaning brush 49 as shown in FIG. 8.

As mentioned previously, the electrothermographic recording layer of the recording medium for use with the transfer-type electrothermographic recording method according to the present invention preferably comprises a dielectric material having a volume resistivity of $1\times10^{12}$ Ω.cm or more at 25° C. and $1\times10^{14}$ Ω.cm or less at a temperature in the range of 110° to 130° C., which is smaller than the volume resistivity at 25° C.

Figure 9:
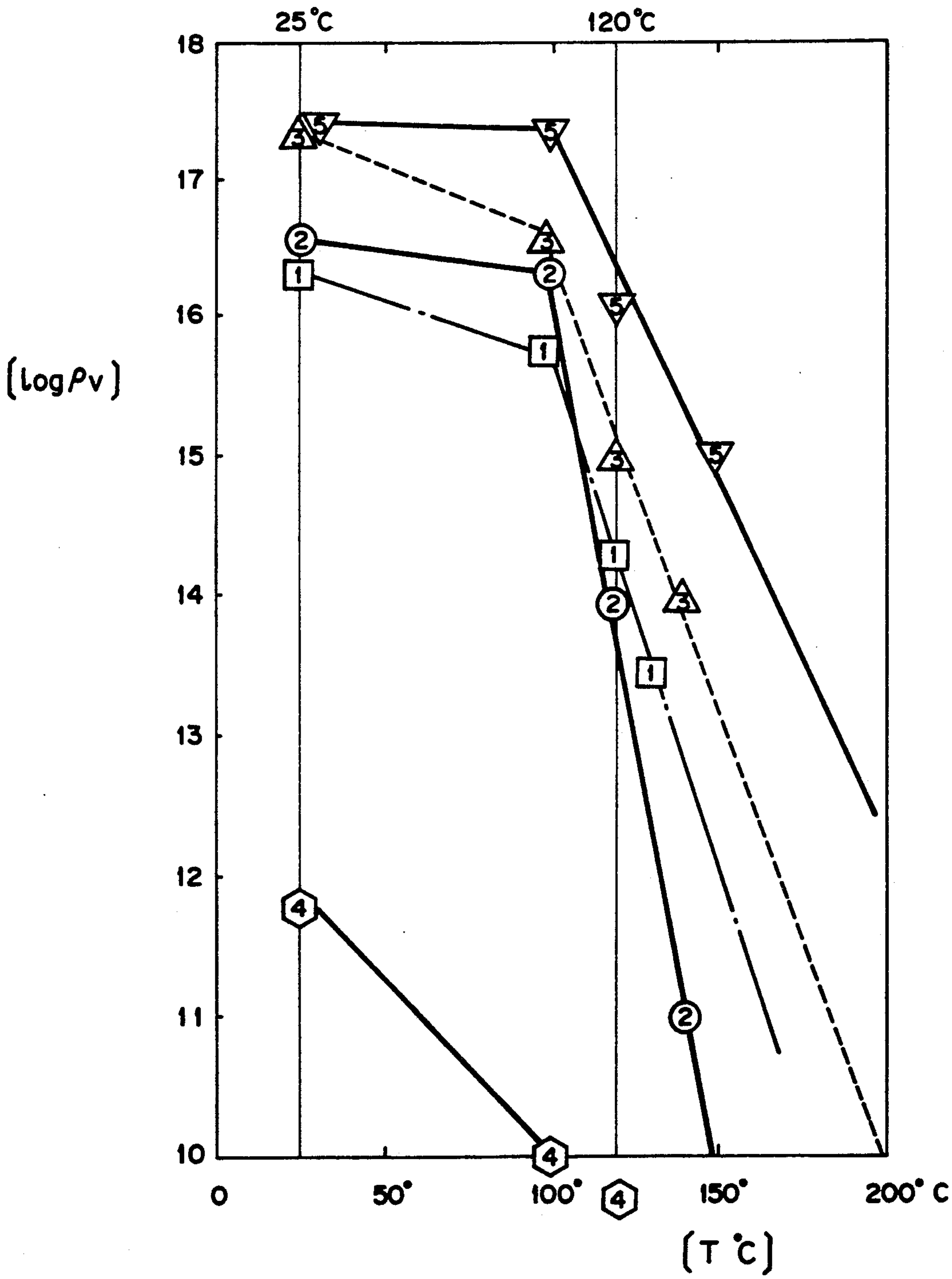
FIG. 9 is a graph showing the relationship between the volume resistivity of each dielectric material and the temperature.

The characteristics of the aforementioned dielectric material for the electrothermographic recording layer for use in the present invention will now be explained in detail with reference to the graph in FIG. 9.

In this figure, the temperature-dependent properties of the volume resistivity [logρv] of polyethylene (1), polypropylene (2), polyethylene terephthalate (3), an antistatic-agent-containing vinyl chloride (4) and tetrafluoroethylene (5) are shown. As can be seen from the graph, the temperature-dependent properties of the volume resistivity [logρv] of polyethylene (1), polypropylene (2) and polyethylene terephthalate (3) are excellent.

In contrast to this, when the antistatic-agent-containing vinyl chloride (4) is used as a dielectric material for the electrothermographic recording layer, a sufficient amount of electrical charge is not retained at the suface of the recording layer because the volume resistivity of the antistatic-agent-containing vinyl chloride (4) is as low as $8\times10^{11}$ Ω.cm at 25° C. prior to the formation of latent electrostatic images. The image density of the obtained image area is therefore low, so that the S/N ratio, that is, the ratio of the density of an image area to the density of a non-image area, is low. The resulting images are unclear.

In the case of tetrafluoroethylene (5), the volume resistivity thereof is as high as $1\times10^{16}$ Ω.cm at 120° C. and is not sufficiently increased when the temperature is decreased. Therefore, the electrical charge on the recording layer does not leak after the application of thermal energy thereto to form a latent electrostatic image. As a result, the S/N ratio obtained is low and therefore images obtained are unclear.

According to the electrothermographic recording method of the present invention, the latent electrostatic image is formed on the electrothermographic recording layer of the recording medium only when the thermal energy is applied thereto. It is therefore preferable that the development be carried out simultaneously with or immediately after the application of the thermal image recording signals.

In the present invention, both a one-component type developer and a two-component type developer can be employed for the development of latent electrostatic images. An example of an electrothermographic recording method using a two-component developer according to the present invention will now be explained with reference to FIG. 10.

In this example, the thermal image recording signals corresponding to an original image to be reproduced are applied to an electrothermographic recording medium 3*a* comprising an electroconductive layer 2 formed on an electrothermographic recording layer 1 from the back side of the electroconductive layer 2 by a thermal head 5. Simultaneously with the application of the thermal image recording signals to the recording medium 3*a*, an AC is applied by an AC power source 39 across (i) the recording medium 3*a* and (ii) a development roller 36 comprising a sleeve 35 with a built-in magnet 34, which bears thereon a two-component developer 33, in such a manner that the development roller 36 is biased to a negative polarity by the AC. The two-component developer 33 consists of electroconductive magnetic carrier particles 32 with a particle diameter of about 100 μm and a negatively chargeable, electrically insulating toner particles 31 with a particle diameter of about 10 μm. In this case, the thermally written portion of the recording layer 1 to which the thermal image recording signals are applied is positively biased when the negatively biased AC current is applied to the development roller 36. As a result, positive carriers, that is, positive holes, existing in the thermally written portion are moved toward the surface of the dielectric recording layer 1. On the other hand, in the portion where no thermal image recording signals are applied, that is, in the background portion on the recording layer 1, no carriers or positive holes are activated so that they stay at a bottom portion of the recording layer 1 near the electroconductive layer 2. Thus, a latent electrostatic image is formed on the electrothermographic recording layer 1 and developed with the two-component developer 33.

Figure 10:
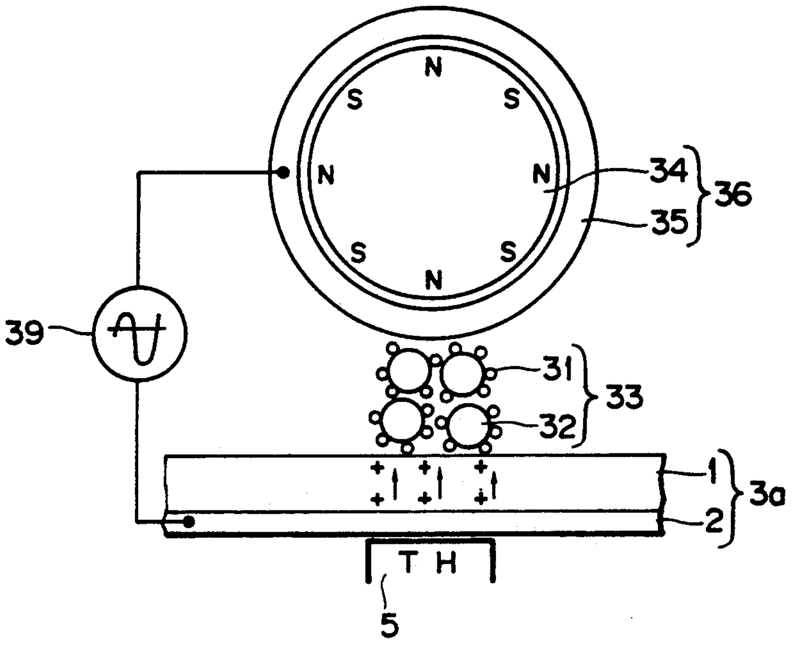
FIG. 10 is a schematical illustration in explanation of the principle of the transfer-type electrothermographic recording method according to the present invention.

When a polymer film of polyethylene or polypropylene with a small polarity is used for a dielectric electrothermographic recording layer of the recording medium 3, the difference between the movement of positive holes and that of electrons is so small that such a polymer film exhibits almost the same potential attenuation characteristics either by positive charging under application of heat or by negative charging under application of heat. Therefore, a latent electrostatic image is formed on the recording layer only when the thermal energy is applied thereto and the development can be performed. In addition, the recording layer can be easily initialized by the application thereto of a biased AC, which is opposite in polarity to the AC current employed at the development step. In the case of FIG. 10, a positively biased AC is applied for initialization of the recording layer.

To achieve the recording method, it is preferable that the development of the latent electrostatic image formed on the electrothermographic layer of the recording medium be performed using a development roller with application of a positively or negatively biased AC as described above.

EXAMPLE 5

Figure 11:
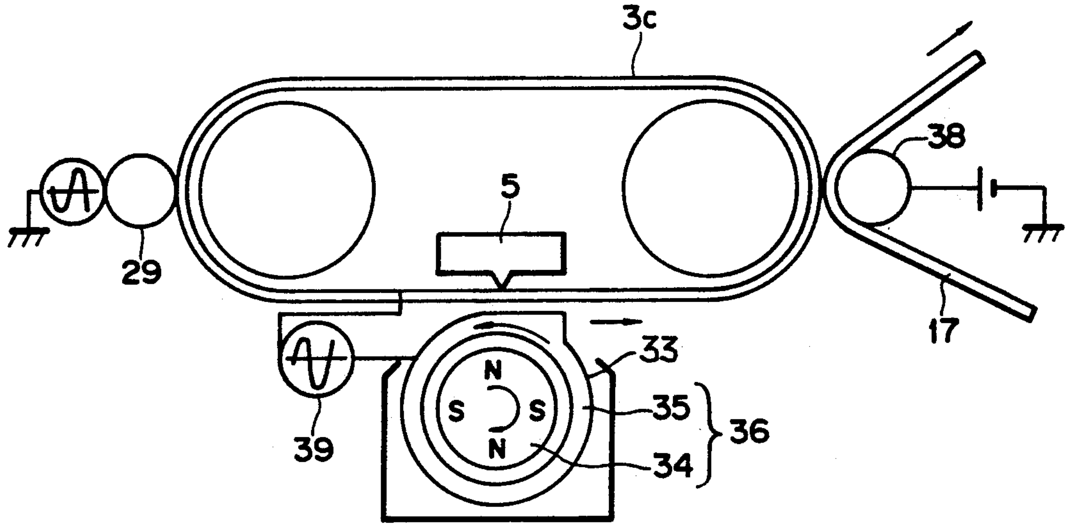
FIG. 11 is a schematical illustration of a fourth embodiment of the recording apparatus for the transfer-type electrothermographic recording method according to the present invention.

An electrothermographic recording medium 3*c* with a structure as shown in FIG. 2(*a*), comprising a polypropylene film with a thickness of 25 μm serving as an electrothermographic recording layer and an aluminum-deposited layer, serving as an electroconductive layer, was prepared in the form of an endless belt. Using the above recording medium 3*c*, an electrothermographic recording apparatus No. 4 according to the present invention was constructed as shown in FIG. 11.

In this recording apparatus, a thermal image recording signal with a thermal energy of 0.5 mJ/dot was applied to the electroconductive layer by using a thermal head 5 with a dot density of 8 dots/mm to form a latent electrostatic image on the electrothermographic recording layer.

Simultaneously with the application of the thermal image recording signal, the latent electrostatic image thus formed was developed with a developer 33 on a development roller 36, under application of a negatively biased AC of 1 kHz having a negative peak of −500 V and a positive peak of +200 V by an AC power source 39 to the above development roller 36. The above developer 33 was a commercially available negatively chargeable cyan toner for a commercially available color copier (Trademark "Ricoh Color 5000", made by Ricoh Company, Ltd.). The resulting toner image formed on the electrothermographic recording layer was transferred to a transfer sheet 17, a commercially available transfer paper (Trademark "Type 6000", made by Ricoh Company, Ltd.) for plain paper copier, using a transfer roller 38 by which a positive charge of 500 V was applied to the paper 17. Then, the image thus transferred on the transfer paper 17 was fixed thereon by a heat-application roller. As a result, clear images with an image density of 1.4 were produced in a cyan color.

By the repetition of the above recording process using a magenta toner and an yellow toner, a full-color image was obtained.

The toner remaining on the recording medium was removed therefrom and the recording medium was initialized by using a cleaning roller 29 to which a positively biased AC was applied as illustrated in FIG. 11.

EXAMPLE 6

Using the same electrothermographic recording apparatus as in Example 5, which is shown in FIG. 11, the same electrothermographic recording method as employed in Example 5 was repeated except that the development unit used in Example 5 was replaced by a development unit for a one-component, electroconductive magnetic toner composed of 60 wt.% of a magnetic material and 40 wt.% of a styrene-acrylic resin and that the negatively biased AC current applied to the development roller in Example 5 was changed to a positive DC voltage of 500 V.

As a result, clear images were obtained in the same manner as in Example 5.

According to the electrothermographic recording method of the present invention, the surface of the electrothermographic recording layer of the recording medium where the development is performed is not subjected to any stress due to the application thereto of heat and pressure, so that the deterioration of the recording layer can be made zero or minimized. This is because the latent electrostatic image is formed on the charged surface of the recording layer by applying thermal signals to the side opposite to the above charged surface of the recording layer. Therefore, the surface of the recording layer is always reliable. In addition to the above, when the thermal-writing step and the development step are carried out simultaneously, the recording process can be simplified and the operation reliability of the process can be significantly increased.

What is claimed is:

1. A transfer-type electrothermographic recording method, comprising the steps of:

charging an electrothermographic recording layer of an electrothermographic recording medium by applying charge to only a first surface of said recording layer, said recording layer having a second surface opposing the first surface, said first surface of said recording layer forming a first surface of said recording medium, said recording layer exhibits chargeability A at room temperature and chargeability B above room temperature, where the chargeability A and B are in the relationship of $A>B\geqq 0$;

forming a latent electrostatic image of a selected polarity on the first surface of said electrothermographic recording layer by applying thermal image recording signals which correspond to an original image to the second surface of said electrothermographic recording layer by reducing the chargeability of the recording layer; and developing said latent electrostatic image with a toner whose polarity is the same as or opposite to the polarity of said selected polarity which forms the latent electrostatic image, to form a toner image.

2. The transfer-type electrothermographic recording method as claimed in claim 1, wherein said developing said latent electrostatic image is performed simultaneously or immediately after the step of forming said latent electrostatic image.

3. The transfer-type electrothermographic recording method as claimed in claim 2, wherein said forming a latent electrostatic image is performed by application of a positively or negatively biased AC to said electrothermographic recording layer.

4. The transfer-type electrothermographic recording method as claimed in claim 2, wherein the step of developing said latent electrostatic image is performed by a development roller to which a positively or negatively biased voltage is applied.

5. The transfer-type electrothermographic recording method as claimed in claim 1, further comprising a step: applying a bias voltage with the same polarity as that of said latent electrostatic image to a side of said electrothermographic recording medium opposite to said thermal head simultaneously with the application of said thermal image recording signals by said thermal head.

6. The transfer-type electrothermographic recording method as claimed in claim 1, wherein said electrothermographic recording layer comprises a dielectric material having a volume resistivity of $1\times10^{12}$ Ω.cm or more at 25° C., and a volume resistivity of $1\times10^{14}$ Ω.cm or less at a temperature in the range of 110° C. to 120° C., which is smaller than the volume resistivity at 25° C.

7. The transfer-type electrothermographic recording method as claimed in claim 1, wherein said electrothermographic recording layer comprises a dielectric material having a volume resistivity of $1\times10^{12}$ Ω.cm or more at 25° C., and a volume resistivity of $1\times10^{14}$ Ω.cm or less at a temperature of 110° C. to 130° C., which is smaller than the volume resistivity at 25° C., and the development of said latent electrostatic image is performed by a development roller, which is disposed so as to be directed toward said electrothermographic recording layer, and to which a positive or negative bias AC voltage is applied thereto.

8. The transfer-type electrothermographic recording method as claimed in claim 1, wherein said latent electrostatic image is developed with a toner with the same polarity as that of said latent electrostatic image.

9. The transfer-type electrothermographic recording method as claimed in claim 1, wherein said latent electrostatic image is developed with a toner with the opposite polarity to that of said latent electrostatic image.

10. The transfer-type electrothermographic recording method as claimed in claim 1, further comprising the step: transferring said toner image to a receiving medium.

11. The transfer-type electrothermographic recording method as claimed in claim 1, further comprising the steps: transferring said toner image to a receiving medium; and fixing said toner image transferred onto said receiving medium.

12. A transfer-type electrothermographic recording apparatus, comprising:

charging means for uniformly charging only a first surface of an electrothermographic recording layer of an electrothermographic recording medium said recording layer having a second surface opposing the first surface, which exhibits chargeability A at room temperature and chargeability B above room temperature, where the chargeabilities A and B are in the relationship of $A>B\geqq 0$;

latent electrostatic image formation means for forming a latent electrostatic image of a selected polarity on the charged surface of said electrothermographic recording layer by applying digital thermal signals which correspond to an original image to the second surface of said recording layer in order to reduce the chargeability of the recording layer; and development means for developing said latent electrostatic image with a toner whose polarity is the same as or opposite to said selected polarity of said latent electrostatic image, to form a toner image.

13. The transfer-type electrothermographic recording apparatus as claimed in claim 12, wherein said development means is a development roller to which a positively or negatively biased AC is applied.

14. The transfer-type electrothermographic recording apparatus as claimed in claim 12, further comprising:

image transfer means for transferring said toner image to a receiving medium, and image fixing means for fixing said toner image transferred onto said receiving medium.

* * * * *